Fig. 1.

INVENTORS
TIBOR F. NAGEY
JACK A. HUNTER
BY WILLIAM A. MAXWELL
Benjamin G. Weil
ATTORNEYS

INVENTORS
TIBOR F. NAGEY
JACK A. HUNTER
WILLIAM A. MAXWELL
BY Benjamin G. Weil
ATTORNEYS United States Patent Office 3,086,933
Patented Apr. 23, 1963

3,086,933
TRANSPORTABLE NUCLEAR REACTOR
POWER PLANT
Tibor F. Nagey, Indianapolis, Ind., Jack A. Hunter, Towson, Md., and William A. Maxwell, Dunedin, Fla., assignors to Martin-Marietta Corporation, a corporation of Maryland
Continuation of application Ser. No. 684,501, Sept. 17, 1957. This application Feb. 4, 1960, Ser. No. 7,725
2 Claims. (Cl. 204—193.2)

The present invention relates generally to nuclear power plants, and more particularly to a heterogeneous, pressurized, light-water moderated and cooled reactor system which may be readily transported and installed.

This application is a continuation of the application by Tibor F. Nagey et al. for "Transportable Nuclear Reactor Power Plant," Serial No. 684,501, filed September 17, 1957, now abandoned.

Small reactor power packages ranging up to 20,000 kilowatts of electrical output will become increasingly important in supplying power to many small and yet-to-be industrialized areas of the world. The need also exists for packaged power components which may be carried by air to a military site and there connected together to form a complete system.

Conventional sources of heat, light and power present difficult logistic problems for military and industrial operations in many parts of the world where ordinary fuel supplies are not available. A nuclear power plant, on the other hand, requires no fuel storage, it practically eliminates fuel supply problems and demands a minimum of operating personnel and maintenance.

In view of the foregoing it is the principal object of the present invention to provide an efficient nuclear power plant of relatively small size and light weight which may be readily transported from the point of manufacture to the site of operation.

It is also an object of the invention to provide a nuclear power plant of inherently simple design which is nevertheless extremely safe and reliable in operation. A power system in accordance with the present invention may be easily installed and prepared for operation.

The key component in a power generating system in accordance with the invention is the nuclear power reactor which may, if desired, be optimized for light weight rather than thermal efficiency. The reactor is of the pressurized water type but no thermal shielding is provided within the pressure vessel, thus permitting a substantial reduction in the overall diameter of the reactor. This in turn allows a reduction in wall thickness and hence a reduction in the amount of heat generated as compared to a heavier walled vessel. The thermal shielding and nuclear reflection are accomplished by the pressure shell, its outer layer of insulation and the surrounding water in which the entire reactor is submerged.

The second principal factor that has made possible a reduction in size as well as a considerable simplification of the core itself is the basic fuel element employed.

Ideally, the fuel element should possess good radiation stability and be able to withstand high temperatures. Its construction should be such as to provide the largest possible heat transfer area to facilitate the transmittal of heat generated therein. In addition, it should be relatively easy and inexpensive to fabricate. In the design of fuel elements for portable packaged power stations, lightness of weight as well as structural strength and rigidity with a minimum of extraneous supports are also major considerations.

Heretofore the so-called plate design has generally been used in fuel elements for water-moderated reactors. Such fuel elements consist of a set of long plates containing fissionable material with thin claddings on both sides resulting in a sandwich type structure. The plates may be flat or slightly curved and are held in spaced relation in a box-like metal frame to form a composite fuel element.

The construction of composite fuel elements of the flat plate type has been found to lack structural strength and rigidity. In practice, differential pressures developed between adjacent flow channels defined by the spaced plates has in some instances caused the plates to buckle and touch. Furthermore, the side plates forming the supporting frame not only contribute substantially to the weight of the core but also act to increase the metal to water ratio, thereby increasing the neutron-absorbing cross-section and reducing the efficiency of the device.

In accordance with the present invention the core of the reactor is constituted of fuel elements of tubular geometry having improved structural strength and rigidity. No supporting structure is needed within the nuclear core thereby greatly enhancing the nuclear efficiency. The tubular construction lends itself to the flow of water both inside and outside of the tubes to afford a maximum of heat transfer surface for a given volume of heat generating material. This basic shape also gives excellent hydrodynamic characteristics. All these factors combine to provide a compact core of minimum size for the required performance.

It is a further object of the invention to provide a nuclear core constituted by an assembly of fuel element bundles fitted into the core configuration, each bundle having three extended tubes held together by an adaptor ring which fits into a socket built into a supporting grid. Through the usage of tubular fuel elements it is possible to eliminate all obstructing supports within the effective heat transfer surface area as individual envelopes for each fuel unit are omitted, resulting in the lowest possible metal to water ratio.

For a better understanding of the invention, as well as further objects and features thereof, reference is made to the following detailed description of one specific embodiment thereof which illustrates the invention. The description is to be read in connection with the accompanying drawings wherein like elements in the views are identified by like reference numerals.

GENERAL DESCRIPTION

Figure 1:
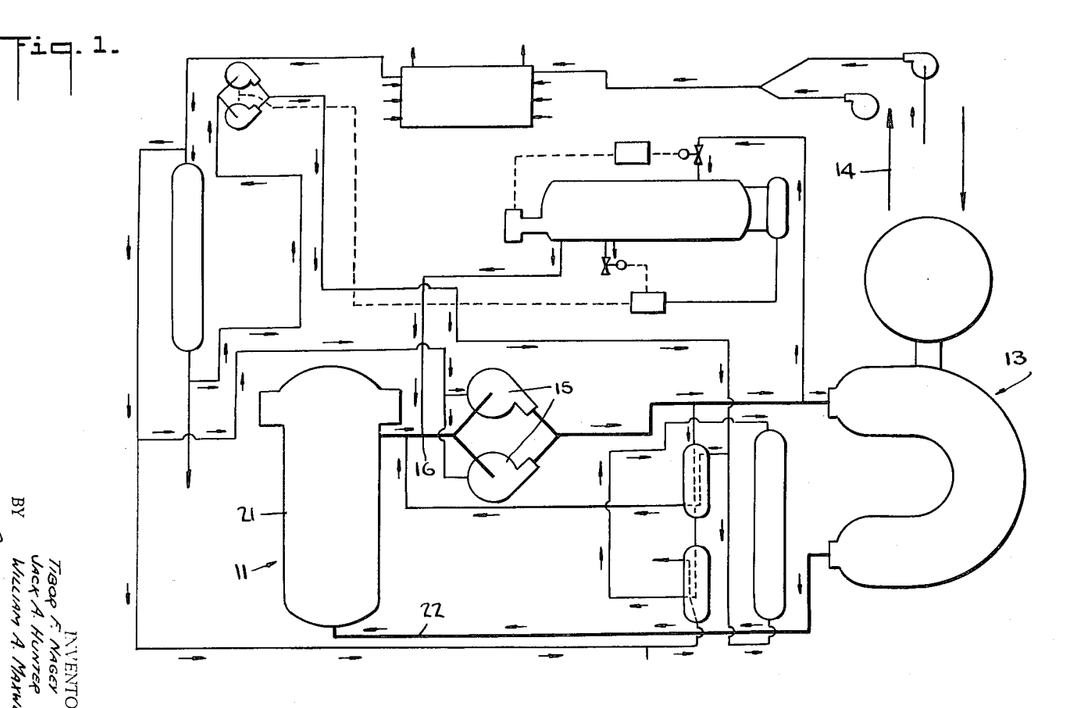
FIGURE 1 is a schematic view showing the primary loop flow diagram for an embodiment of the present invention.
Figures 2, 3:
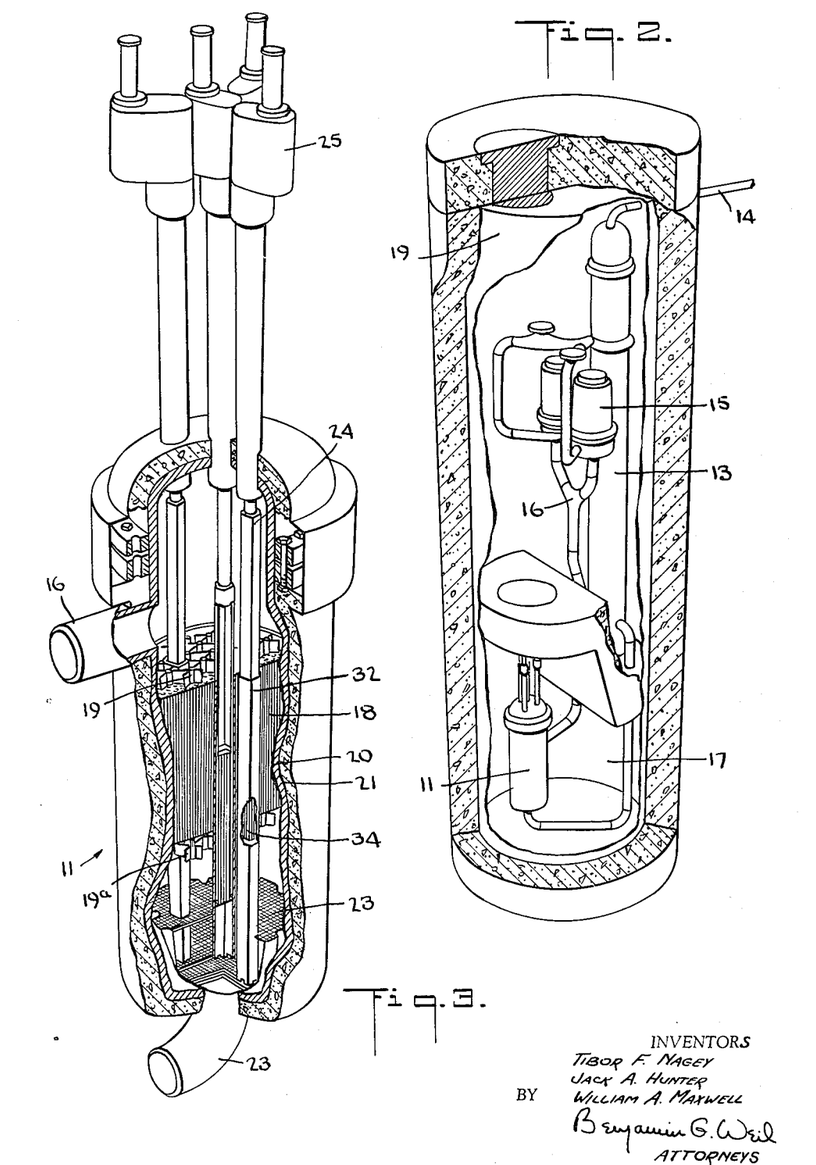
FIGURE 2 is a perspective view of a primary loop for a reactor system in accordance with the invention, the casing being cut away to expose the interior.
FIGURE 3 is a perspective view of the nuclear reactor forming part of the primary loop, the pressure vessel being cut away to reveal the core and the control rods.

Referring now to FIGURES 1 and 2 there is shown the primary loop of a power reactor system in accordance with one embodiment of the invention. The primary loop represents one component in a system which also includes a turbo-generator driven by steam produced in the primary loop, suitable switch gear deaerators, etc. The invention resides in the structure and function of the primary loop, hence the turbo-generator and other conventional components which receive this power from the primary loop will not be shown herein. The principle of the reactor system is the same as that of a conventional steam-turbine generating plant, the source of heat being the principal difference.

The major elements of the primary loop are a steel envelope 10 within which is contained a nuclear reactor generally designated by numeral 11. The steel envelope is preferably surrounded by reinforced concrete shielding 12. A heat exchanger or steam generator 13 is provided in association with the reactor 11, the output pipe 14 of the generator being the steam line to the turbine or other steam driven motor for producing power. Canned pumps 15 furnish pressurized water to the reactor, the primary piping being designated by numeral 16. The interior of the steel envelope 10 is filled with shielding water 17. The power reactor is designed without a complete thermal and radiation shield and when installed it is placed below ground and preferably in a larger body of water to take advantage of natural shielding.

By elimination of the thermal shield and the use of a small pressure vessel, the reactor weight has been reduced by as high a factor as 50 percent.

Referring now to FIGURE 3 there is separately shown the nuclear reactor 11, the reactor comprising a core 18 of tubular fuel elements, supported at either end by upper and lower grids 19 and 19a within a pressure vessel 20. Vessel 20 is encased in an insulation jacket 21. Pressurized water is fed into the pressure vessel 20 through inlet pipe 22 and diffused therein before passage through the core 18 by means of baffle plates 23. Baffle plates 23 are perforated to create an even velocity profile.

The heated water is discharged from the reactor through the primary line 16. Control of the reactor is effected by control rods 24 which are projected into the core, or retracted therefrom by means of pistons 24a operated by a control rod mechanism 25. Four control rods are provided, one in the center and three eccentrically thereof, the rods being fabricated of Boron-10.

The reactor shown in FIGURE 3 is designed to operate at a power output level (heat) of 8 megawatts. The performance and design data of such a device may, for example, be as follows:

| | |
|---|---|
| Reactor weight (minus shield and water) | 6000 pounds. |
| Overall dimensions at pressure vessel | 84 inches long by 24¼ inches outside diameter and 23 inches inside diameter. |
| Core life | 550 days. |
| Reactor coolant | 2000 p.s.i. water. |
| Reactor coolant flow | 1,295,000 pounds per hour. |
| Coolant velocity in core | 3.6 ft./sec. |
| Mean coolant temperature | 510° Fahrenheit. |
| Coolant temperature drop | 18° Fahrenheit. |
| Metal/water ratio | 0.195. |

The nuclear data may, for example, be as follows:

| | |
|---|---|
| Critical mass | 17.66 kilograms of U 235. |
| Burn-up (550 full power days) | 31 percent. |
| Average flux (thermal) | $1.3 \times 10^{13}$ neutrons per $(cm.^2)$ (sec.). |
| Burnable poison loading | 125.9 grams of natural boron. |
| Control rods: | |
| Number | Four. |
| Material | 3.5% boron −10 in stainless steel. |
| Length (active) | 23 inches. |
| Diameter | 3 inches. |
| Travel (active) | 23 inches. |

Figures 4, 5, 6, 7:
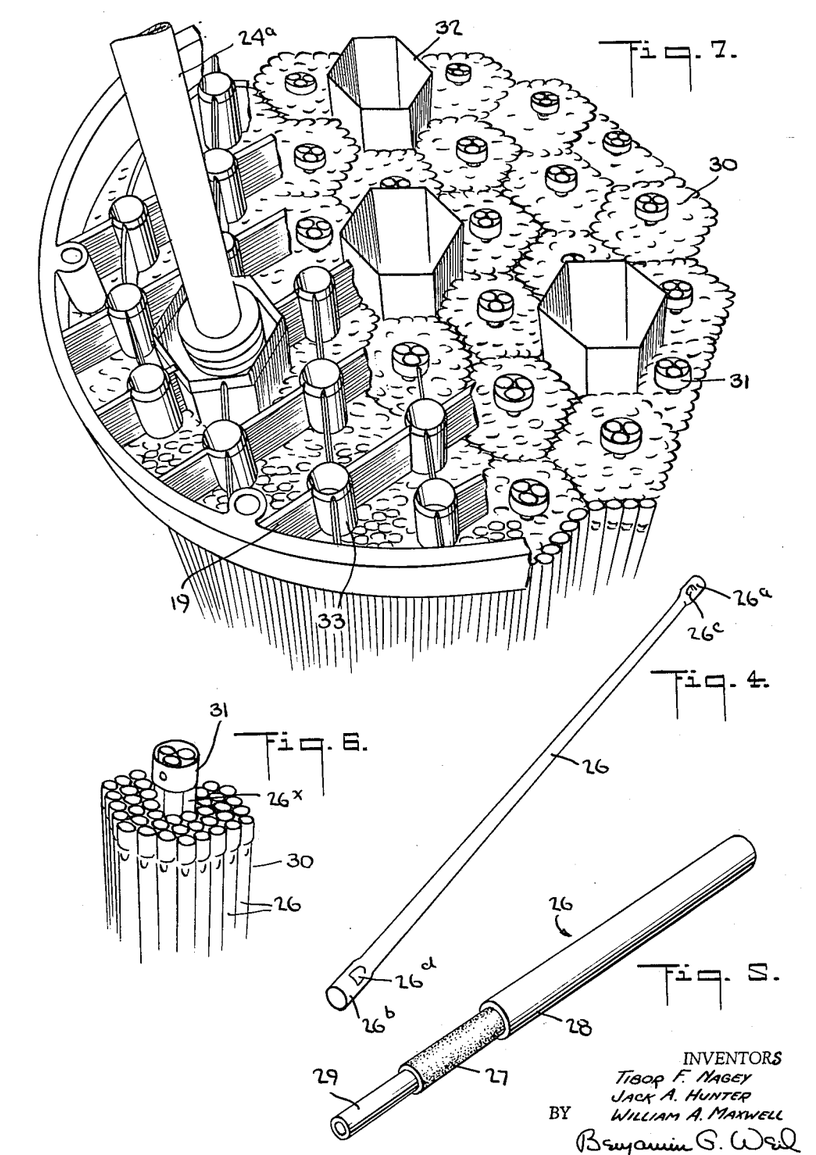
FIGURE 4 is a perspective view of a single tubular fuel element.
FIGURE 5 is a schematic showing of the construction of the live portion of the fuel element.
FIGURE 6 illustrates a bundle constituted by a plurality of interconnected tubular fuel elements.
FIGURE 7 is a perspective view of the reactor core constituted by an assemblage of fuel element bundles.

An individual fuel element 26 is shown in FIGURE 4. Each fuel element 26 may be constituted by a 0.375 inch outside diameter tube with a 0.030 inch wall. As shown in FIGURE 5, the matrix 27 at the fuel element is formed by a sintered mixture of stainless steel powder, uranium oxide and boron nitride (BN) and is 0.020 inch thick. The composition of this matrix by weight may be 78.75% stainless steel, 21% [fully] enriched $UO_2$ and 0.25% $B_2O_3$. Preferably this matrix is clad with a 0.005 inch stainless steel outer cladding 28 and a similar inner cladding 29 on the inner surface, thereby making the total wall thickness 0.030 inch.

The unfueled ends 26a and 26b of each fuel element are flared. Flute type switches 26c and 26d are formed in the flared ends to effect equal flow distribution of the coolant between the inner and outer surfaces of the tube.

As shown in FIGURE 6, a group of tubular fuel elements 26 may be spot welded together at their belled ends to form a bundle 30 generally hexagonal in shape. Three tubes 26x at the center of the bundle are of extended length so that they project from either end of the bundle to provide means for holding the bundles in position in the core and means for grasping the bundles to remove them as desired. The active fuel area of the extended length tubes 26x is identical to that of the shorter tubes, the dead end extensions being solely to facilitate handling and securing the bundles. A ring 31 may be placed over the ends of the extended tubes at either end of the bundle.

To form the core assembly, a predetermined number of bundles are grouped together geometrically as shown in FIGURE 7, with four spaces left vacant to make room for the control rods. Hexagonal sleeves 32, the size of one fuel bundle, are placed in these spaces or wells to receive the control rods.

The core is 23 inches long with a 20¾ inch mean diameter. It contains 1548 fuel elements.

Figure 9:
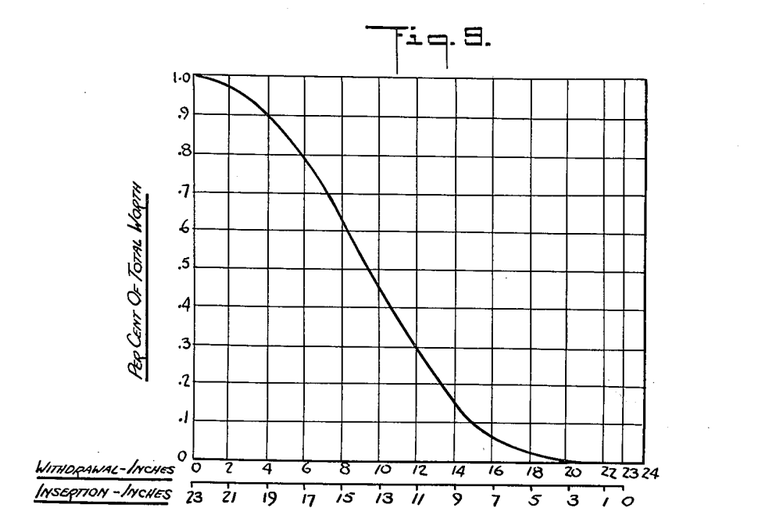
FIGURE 9 is a graph showing the relative worth of control rods versus position.

As shown in FIGURE 7, an upper grid 19 (see also FIGURE 3) is provided at the points of intersection with sockets 33 which accommodate the end rings 31 on the bundles, the grid serving to align and retail the core in a fixed position within the reactor. The control rods 24 are reciprocable within the well sleeves 32 and are supported for axial movement by the pistons 24a. Below and forming a part of each control rod assembly 24 (see FIGURE 3) there may be a small bundle 34 of twenty-seven fuel tubes. As the control rod assembly is withdrawn by the piston 24a the small fuel bundle 34 is drawn into the core. This is done to reduce neutron flux peaking in the control rod wells when rods are withdrawn. The rod scram mechanism, to be later described, is designed to scram in 0.3 second. The control problem is minimized by the inherently large negative temperature coefficient of the reactor and the use of burnable poisons in the fuel matrix. As stated, the use of both neutron absorbing and fuel materials keeps the flux from peaking when the control rods are not in the reactor and increases the effectiveness of the control rods by reducing fuel content when the control rods are in place in the reactor. The value of the present type of control rods without the added factor of the fuel on the ends is 35.5% for the entire cluster in the cold, clean case, and 21% for the entire cluster in the hot, clean case. These values were computed under conditions designed to yield the most conservative results. The reactor has twice as much control as is needed at all times. Any rod will scram the reactor, and if all of the others should fail to scram, the reversal of just one of these rods will hold the reactor sub-critical. For the value of the rods versus inches of withdrawal or insertion see FIGURE 9.

As pointed out previously there are 27 fuel tubes attached to the base of each control rod. The amount of fuel which is removed by complete insertion of all rods is 6.98%.

CONTROL ROD ACTUATION

The control rod actuation mechanism (25 in FIGURE 3) must be capable of moving either up or down at a controlled rate of speed. The movement and location of the rods is vitally important. Inherent safety features are necessary in order to scram the reactor. In the event of power failure or for nuclear reasons the rods must be driven to a safe position in an extremely short time.

Figure 10:
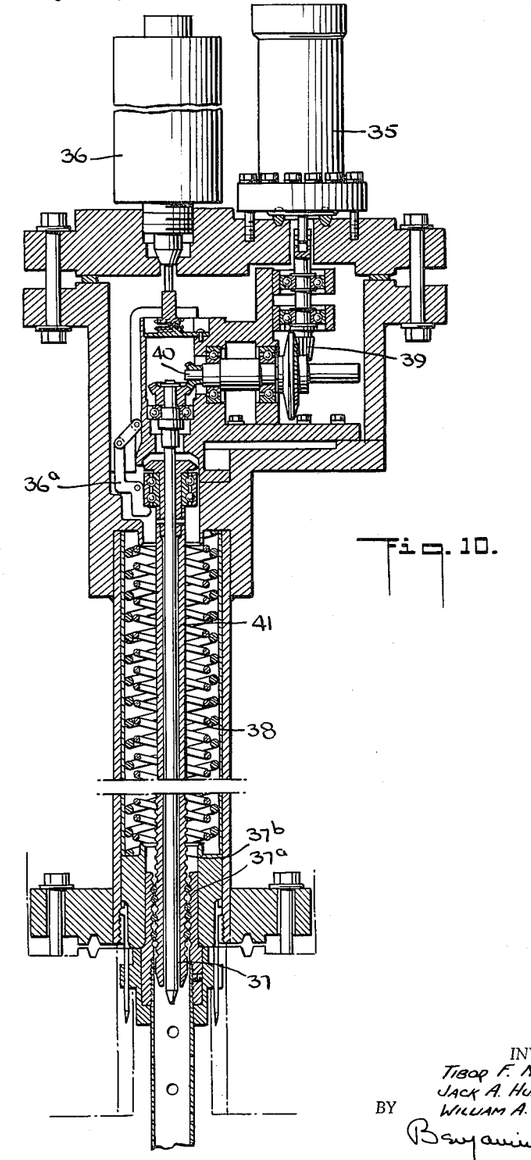
FIGURE 10 is a longitudinal sectional view of the actuating mechanism for a control rod.
Figure 13:
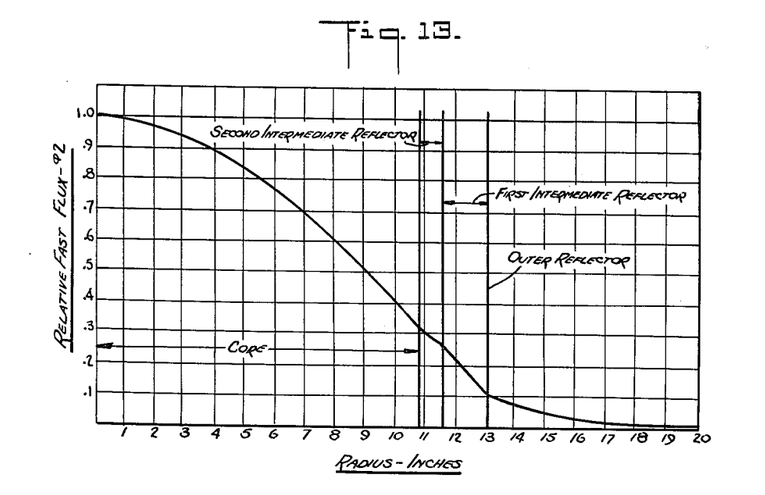
FIGURE 13 is a graph showing the relative fast flux versus radius for the reactor.
Figure 14:
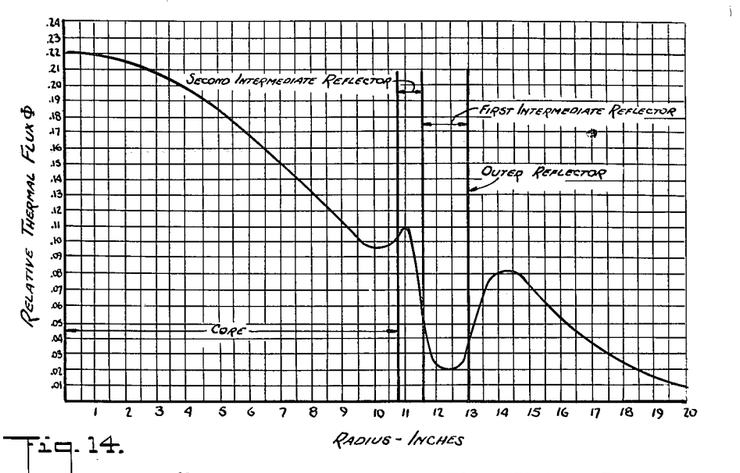
FIGURE 14 is a graph showing the relative thermal flux versus radius of the reactor.
Figure 15:
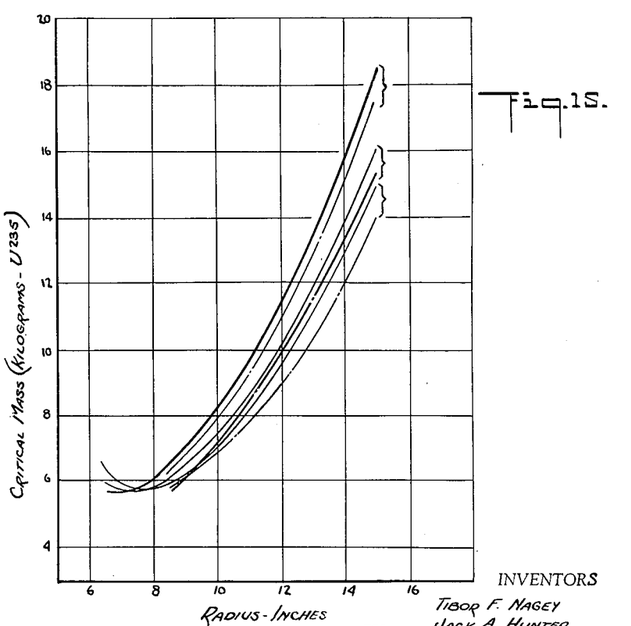
FIGURE 15 is a graph showing the critical mass versus the radius of the reactor.

The control rod actuator is shown in FIGURE 10 and comprises a motor 35, a solenoid 36, a ball bearing screw jack 37 and scram springs 38.

The motor 35 is essentially of the vertical, flange-mounted, "canned," constant speed, polyphase squirrel-cage induction type. The motor is attached to the pressure vessel by means of a bolted flange fitted with O ring seals. The input is 3-phase, 440 volts, 60 cycle alternating current. The synchronous speed is 3600 revolutions per minute, with an output of $\frac{1}{10}$ horsepower. It is also reversible.

The solenoid which is used on the actuator is a vertical screw-mounted, push-down type of "canned" solenoid. It is attached to the pressure vessel by means of a threaded shoulder fitted with a wedge-type sealing lip. Ratings of the solenoid are: input, 28 volts nominal direct current battery source, stroke 0.375 inch, nominal spring load ten pounds of force initially, increasing to 30 pounds of force dead weight in the seat position.

The "canned" feature of the motor and solenoid is merely a process which leaves the rotor of the motor and the plunger of the solenoid in the high temperature, high pressure zone, while the windings are sealed away from this condition.

The ball-bearing screw jack 37 is a device, which as the name implies, is a nut 37a and screw 37b, which can be driven in either direction through a series of balls. The balls after completing a driving cycle continue through a circuit and return for another driving phase.

Two sets of gears 39 and 40 provide the necessary reduction from the motor to the ball-bearing screw jack. The first set are called spiroid gears and give an extremely high reduction. The second set are typical bevel gears and have a much smaller reduction.

Three proximity-type limit switches (not shown) are used on the unit. These switches are magnets which are located outside the pressure vessel. For the most part the parts are of non-magnetic stainless steel. However, in order to actuate the limit switches a magnetic material is used. One switch indicates when the rod is in its lowest or safe position. Another switch tells when the rod is completely withdrawn. The third switch is used to form a part of the latching mechanism.

To clarify the operation of the mechanism, it can be assumed that the control rod is in the scrammed or safe position. The motor 35 is then started. The square shaft 41 which is driven through the gear train by the motor now rotates. The square shaft in turn is now a driving member rotating the screw 37b. The nut 37a for this screw is at the lowest position and keyed so it cannot turn; therefore, the screw climbs up the square shaft. When the screw reaches the upper limit of its travel one of the limit switches stops the motor and energizes the solenoid. The solenoid 36 in turn closes three trip levers 36a which grasp the top of the screw.

The motor direction is now reversed and the square rod causes the screw to rotate again. In this instance the nut, still keyed in place, climbs up the screw until the desired position is reached. As the nut rises it compresses the scram springs 38. The unit is now cocked and ready to perform the "scram" function if required.

In the event that a scram becomes necessary or a power failure occurs the solenoid becomes deenergized. The latching levers 36a are now permitted to open and the scram springs drive the rod plus the nut and screw home to a safe position.

When the complete unit reaches the lower end of its travel it enters a dash pot. The dash pot is merely a cushion, mounted near the top of the pressure vessel, to absorb the shock of decelerating this rapidly moving mass. The time for complete travel is under three tenths second.

CORE DESIGN AND FLOW ANALYSIS

*Flow through bundles.*—As indicated previously, the coolant flows inside and outside the fuel element tubes. To obtain optimum heat transfer the bulk flow velocity and bulk temperature rise has to be the same inside and outside the tubes. These conditions are induced if the equivalent cross-section of the flow path outside of the tubes is equal to the inside cross-section of the tubes.

As pointed out before, the ends of the tubes (26a, 26b—FIGURE 4) are expanded. This is done for a length of about ¼ of an inch to a diameter equal to the required tube spacing. Flutes (26c and 26d) are formed on each end to guide part of the coolant flow to the outside. The tubes may then be spot welded or soldered together in the expanded portions to form the bundle.

It has been found that a flute depth which produces equal equivalent cross-sections on the inside and outside of the tubes also produces inside and outside velocities which are substantially equal. This preferred flute depth was determined to be 0.150 inch.

Figures 8, 11, 12:
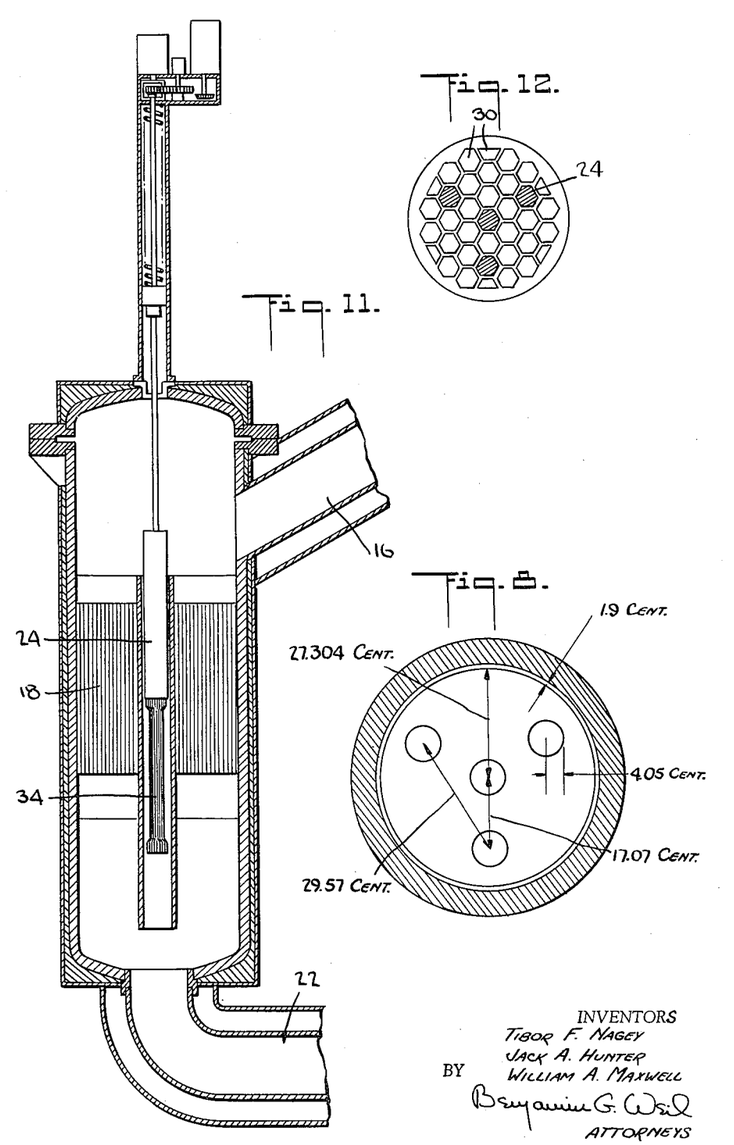
FIGURE 8 is a schematic diagram of the reactor core.
FIGURES 11 and 12 are schematic diagrams of the power reactor.

*Flow outside core.*—The core, as seen in FIGURES 11 and 12, is in the approximate form of a right circular cylinder. The perimeter of this cylinder is irregular, its greatest diameter being 21.5 inches and its mean diameter 20.75 inches. This core fits into the cylindrical pressure vessel which has an inside diameter of 23.0 inches. An annular area between the pressure vessel and the core of about 53 square inches exists through which the coolant flow must be restrained.

An annular can was chosen to restrain this flow. The can is as long as the core itself and has its inside perimeter so shaped as to fit the irregular perimeter of the core. To permit cooling of the pressure vessel wall, the outside diameter of the can was set at 22.875 inches, which is 0.125 inch less than the inside diameter of the pressure vessel. A $\frac{1}{16}$ inch wide annulus then exists for flow between the can and the pressure vessel. Calculations reveal that 24 gallons per minute of coolant will flow through this annular flow area at a velocity of two feet per second.

The total heat generated in the pressure vessel wall has been estimated to be 282,000 B.t.u. per hour or 82.6 kilowatts. If it is assumed that the outside of the pressure vessel is perfectly insulated, the maximum heat flux will occur at the center of the wall and will be 270,000 B.t.u. per hour foot squared.

With this heat generation data and the flow data, the following temperatures were calculated:

| | Degrees Fahrenheit |
|---|---|
| Annulus inlet temperature | 501 |
| Core inlet temperature | 501 |
| Coolant temperature rise through annulus | 9 |
| Coolant temperature at midpoint | 505.5 |
| Film temperature rise at midpoint | 32 |
| Maximum wall temperature at midpoint | 537.5 |

The 1/16 inch annular area is thus adequate to cool the pressure vessel wall with no danger of boiling.

To keep the water inside the annular can from overheating, 84 one-eighth inch holes were drilled in each end. This permits 13 gallons per minute of coolant to flow through the can. The heat generation in this water was assumed to be 1/5 of that in the pressure vessel wall. This heat raised the coolant temperature 1.5 degrees Fahrenheit.

*Flow around control rods.*—Four control rods, as shown in FIGURE 11, pierce the core. One is located on the center line and the remaining three are equally spaced on a 13.4 inch diameter circle. Each rod consists of an upper poison section in the form of a hexagonal tube 26 7/8 inches long (23 inch active) and a lower section which is a hexagonal cluster of 27 fuel tubes 25 1/2 inches long. The entire rod is surrounded by a hexagonal sheath or can 53 5/8 inches long. A clearance of 3/32 inch exists between the control rod and the can.

Three flow paths were investigated for the control rod assembly. The first path is through the tube bundle and then through the inside of the poison section. The second is in the annular area between the fuel bundle, poison section and the enclosed can. The third path is the annular area between the outside of the can and the surrounding tube bundles.

The resistance to flow for the two paths inside the enclosed can depends on the location of the control rods. Each of these paths were investigated for three positions of the control rods—fully inserted, withdrawn half-way and fully withdrawn.

Equivalent diameters for the various paths were calculated and flows found from a trial and error balancing of resistance and known pressure drops. Table 1 summarizes the results for one rod.

*Table 1*

Flow Distributions

|  | Fully Inserted | | Halfway Withdrawn | | Fully Withdrawn | |
| --- | --- | --- | --- | --- | --- | --- |
|  | V [1] | Q [2] | V | Q | V | Q |
| Path 1: | | | | | | |
| Inside Tube bundle | 3.7 | } 36.2 | { 3.7 | } 36.2 | { 3.7 | } 36.2 |
| Inside poison Section | 1.9 | | { 1.9 | | { 1.9 | |
| Path 2: | | | | | | |
| Outside Tube Bundle | 1.6 | } 6.95 | { 2.1 | } 9.1 | { 3.4 | } 14.7 |
| Outside poison Section | 2.1 | | { 2.7 | | { 0 | |
| Path 3: Outside Sheath | 3.0 | ([3]) | 3.0 | ------ | 3.0 | ------ |

[1] Velocity in feet per second.
[2] Flow in gallons per minute.
[3] Velocity decrease is balanced by area increase, so flow per tube outside sheath remains the same as for the regular full tube or about 2.13 gallons per minute per tube.

*Total flow.*—The total flow through the core with the control rods in the probable operating positions, i.e., the three outer rods fully withdrawn and the central rod half withdrawn, is estimated to be 3316 gallons per minute. Of this total, 3065 gallons per minute will be flowing through and around the fuel tubes and the remainder will flow outside the core and through the control rods.

*Flow at inlet.*—To effect a smooth transition from the 8 inch diameter inlet pipe to the 22 inch diameter reactor vessel, a diffuser core with four perforated baffle plates or screens is to be used (see baffle plates 23 in FIGURE 3).

The four plates are of uniform solidity ratio—0.4—and are so spaced in the diffuser core that the pressure drop across each one is equal to the rise in static pressure, or loss in velocity pressure in the space preceding it. The total pressure drop was calculated to be about three pounds per square inch.

*Pressure drops.*—The pressure drops through the various components of the primary loop were calculated to be as follows:

| Component— | Pressure drop (p.s.i.) |
| --- | --- |
| Inlet flow control screens | 2.9 |
| Reactor vessel | 1.6 |
| Steam generator | 4.4 |
| Piping | 3.8 |
| Total | 12.7 |

REACTOR VESSEL

The design of the reactor vessel must not only take into account the stresses due to internal pressure, structural support, earthquakes, etc., but also the extremely high thermal stresses which are encountered due to heat generation in the pressure vessel walls. It has been found from a comparison of material manufacturing and fabricating costs that a solid stainless steel plate is an economical pressure vessel wall material. Stainless steel SI SI Type 347 and Armco Type 17-7 pH are two suitable materials for the pressure vessel.

The vessel is preferably 90 3/4 inches long (refer to FIGURE 11), has a maximum internal diameter of 23 inches and a semi-ellipsoidal head and bottom. The cylindrical walls and the ellipsoidal heads are one and one-half inches thick. The head is flange-connected to the cylindrical section with 28 high-strength one and one-quarter inch diameter bolts. Four bosses, with two inch holes for the control rod shafts, are welded to the head. An eight inch diameter inlet and outlet are the only openings in the vessel body. Brackets are welded to the inside of the vessel walls for holding the reactor core in place.

The following tabulation is a description of the pressure vessel:

Pressure vessel—
  Vessel material __________ SA-26D6, Type 347.
  Internal diameter ________ 23 inches.
  Wall thickness ___________ 1.5 inches.
  Design stress ____________ 9,600 pounds per square inch (maximum shear).
  Thickness of heads _______ 1.5 inches.
  Semi-ellipsoidal heads ____ ASA—standard.
  Flange thickness _________ 3 inches.
  Bolt circle diameter ______ 30 inches.
  Size of bolts ____________ 1.25 inches.
  Number of bolts _________ 28.
  Type of bolts ___________ 12 Unified National Fine (160,000 p.s.i. minimum).
  Overall length of vessel __ 90 3/4 inches.
  Inlet opening ___________ 8 inches.
  Outlet opening __________ 8 inches.
  Insulation _____________ Aerogel.

*Fission product poisoning.*—One of the main requirements for automatic control is to overcome the xenon transient. Enough excess reactivity must be provided so that the reactor can be started at any time. It is also necessary to determine the rate of change of the xenon concentration so that the control rods can be designed accordingly.

While the reactor of the described embodiment is in operation, the xenon concentration increases toward an equilibrium value which occurs approximately 72 hours after start-up, although a very close value is reached in about twenty-four hours. For the reactor described herein, the equilibrium value attained by the xenon concentration is $1.731 \times 10^{15}$ atoms per cubic centimeter. At this point the rate of formation of xenon is equal to the rate of removal. If the reactor is in continuous operation, the amount of reactivity loss to be overcome is the amount calculated at the equilibrium point (−2.5 percent ΔK per K).

If for some reason the reactor should shutdown, the xenon concentration increases steadily for several hours before reaching a maximum because it continues to be formed as a decay product. After reaching the maximum it slowly decreases. This xenon hump occurs about eight hours after shutdown. The xenon concentration at maximum build-up point is $2.6939 \times 10^{15}$ atoms per cubic centimeter, almost twice the amount of that at equilibrium. However, this is a low value in comparison to those of reactors with fluxes in the order of $10^{15}$, and would not seriously hinder the reactor should it be started up at this point. The excess K needed to overcome the loss of reactivity is only 3.9 percent, whereas for a flux of $10^{15}$ as much as 35 percent reactivity can be tied up by xenon build-up.

If the reactor is started up at or near the maximum build-up point, the xenon concentration will decrease very rapidly, falling below the equilibrium value. It will then gradually work its way up again. It is here that the rate of change of the xenon concentration is greatest causing a gain in reactivity at the rate of $2.579 \times 10^{-6} \Delta K$ per second immediately after start-up. The amount of reactivity per second which can be taken care of by the control rods is $1.33 \times 10^{-4}$, which is more than adequate to control the reactivity drop due to xenon burn-out after start-up. The results of calculations show that the reactor fuel loading and multiplication factor keep the xenon transient under control at all times.

From these calculations, it can be seen that xenon poses no problem in either the operation of the reactor or in automatic control of the system. At its highest point, the xenon concentration is not large enough to make the reactor sub-critical. This indicates that if the reactor should be shut down, no waiting period is necessary to start it again. These results also show that should the reactor be started again at the highest xenon concentration, the danger of having the rate of poisoning go down faster than control rods could absorb the resulting excess reactivity would not exist. Under present conditions fission product poisoning does not affect the stability of the system.

LONG TERM REACTIVITY STUDIES

Long term reactivity study is the name given to a group of problems whose solution involves the entire lifetime of the reactor. Under the heading of long term reactivity are such things as determination of the loading of the core, control rod size, negative temperature coefficient, burnable poisons in the reactor and fission product poisoning. Having an estimate of the excess reactivity required in the reactor the control rod size can be determined. The amount of fuel necessary to keep the reactor going for its entire lifetime determines the fuel loading which in turn dictates the burnable poison content in the system. This is a summary of the completed work on long term reactivity studies for the reactor described herein.

| | |
|---|---|
| Total heat production | 8 megawatts. |
| Core lifetime | 1½ years. |
| Core temperature—cold | 68 degrees Fahrenheit. |
| Core temperature—hot | 510 degrees Fahrenheit. |
| Core diameter | 21½ inches. |
| Core height | 23 inches. |
| Core volume | $1.3684 \times 10^5$ cubic centimeters. |
| Moderator | $H_2O$. |
| Coolant | $H_2O$. |
| Reflector | $H_2O$. |
| Reflector temperature | 510 degrees Fahrenheit. |
| Structure | Stainless steel. |
| Metal/water ratio | 0.195. |

Assumptions made for the present work are:

(1) The core is a homogeneous mixture of the components. This should be a fairly accurate assumption for this particular core design and study.
(2) Fuel is fully enriched $U^{235}$;
(3) Fast fission factor and the resonance escape probability product equals one—$\epsilon p = 1$;
(4) Macroscopic transport cross-section of $U^{235}$ is small enough to be negligible;
(5) Burn-up is based on 1.25 gram per megawatt day;
(6) Transport cross-sections and Fermi Age do not change due to build-up of fission products;
(7) Samarium poisoning reaches equilibrium at the same time as xenon-poisoning;
(8) Neutron temperatures are equal to the mean coolant temperature.

It is advantageous to have a flat, long term reactivity curve. This is best accomplished by having the burnable poison burn-up similar to the fuel burn-up. The cross-section of the burnable poison should be close to the cross-section of the fuel.

On the basis of the physical characteristics of various poison materials and the burnable poison requirements boron-10 was chosen as most suitable for this reactor.

The abundance of boron-10 in natural boron is 18.8%. Since boron-10 has such a high cross-section relative to the other isotopes, only the boron-10 need be considered as a neutron absorber if the reactor core is to be poisoned with natural boron.

Since the excess reactivity decreases quite rapidly until xenon has reached its equilibrium concentration after start-up (the most rapid change is due to the temperature effect) and the increase in excess reactivity due to the depletion of boron-10 is in comparison slow, the obvious reference point for the consideration of burnable poison is at about thirty hours when both the temperature and steady state fission products are in equilibrium. Choosing this reference point and arbitrarily choosing 0.0075 as the excess reactivity to be available at this point after introducing the boron, the amount of boron needed is found by adjusting the thermal utilization and leakage until $$\frac{\Delta K}{K} = 0.0075$$

Since the boron burns out exponentially and the fuel burns up more or less linearly, the maximum reactivity in the system occurs after 250 days of operation.

Based on 1.25 grams per megawatt day burn-up, the amount of $U^{235}$ to be burned up to give 12 megawatt years of operation is 5.475 kilograms. The critical mass calculated for the hot clean reactor is 8.56 kilograms. The critical mass calculations were based on the two-group theory. Therefore, from these two values at least 14 kilograms are needed for the reactor to be just critical through its entire lifetime. This does not take into consideration the amount needed to give an excess reactivity to overcome fission products poisoning.

It was found from repeated calculation of reactivity versus time that the best percentage burn-up with the least amount of control necessary is 31 percent $U^{235}$ maximum burn-up.

With the imposed 31 percent $U^{235}$ burn-up limit, the system contains an excess of 3.66 kilograms at shutdown (the core loading at 31 percent $U^{235}$ burn-up being 17.6612 kilograms). The excess fuel at shutdown is 0.01 (maximum) in terms of excess reactivity.

To find the maximum amount of external control needed, it was assumed that the reactor has been operating for about 250 days and was shut down long enough for the xenon to decay out of the system. The maximum negative reactivity needed to hold the reactor subcritical was about 0.111.

Consideration was given also to the case where the reactor is shut down and a start-up is required within a few hours after shutdown.

The usual problem in such a case is an override of the xenon which reaches a maximum concentration six to nine hours after shutdown, at which time the xenon decay overtakes the xenon production (iodine decay). In the reactor described herein, with a flux of about $1.56 \times 10^{13}$ neutrons per centimeter squared per second at 31 percent $U^{235}$ burn-up, the increase in xenon poisoning after shutdown is so small that it may be considered to stay at the equilibrium concentration attained during operation. It remains at this equilibrium until the decay becomes the dominant effect at about nine hours after shutdown.

While there has been shown what is considered to be a preferred embodiment of a reactor in accordance with the invention, it will be recognized that many changes and modifications may be made therein without departing from the essential features of the invention. It is intended, therefore, in the appended claims to cover all such changes as fall within the true spirit of the invention. For convenience and requirements of adequate disclosure, there has been disclosed herein certain inventions which are or will be the subject of copending applications filed by other applicants who are employees of applicants' employer, The Martin Company.

What is claimed is:

1. A nuclear reactor comprising a pressure vessel, a core disposed within said vessel and constituted by an assembly of bundles, each bundle being formed by a plurality of axially spaced interconnected tubular fuel elements disposed in parallel relation, said fuel elements having end portions of enlarged diameter joined to the corresponding end portions of adjacent fuel elements, conduit means for conducting pressurized water unidirectionally through said pressure vessel, slotted flutes in said end portions for apportioning the flow of said pressurized water both inside and outside said tubular fuel elements, a central cluster of elements in each said bundle being of extended length for mounting said bundle, and grids engaging said extended elements of said bundles at either end thereof to support said core within said pressure vessel.

2. A reactor as set forth in claim 1, wherein a ring is placed over each cluster of elements, the ring being received within a socket in said grid.

References Cited in the file of this patent
UNITED STATES PATENTS

| | | |
|---|---|---|
| 2,223,662 | Lear | Dec. 3, 1940 |
| 2,722,733 | Meyer et al. | Nov. 8, 1955 |
| 2,832,733 | Szilard | Apr. 29, 1958 |
| 2,898,384 | Viriot | Aug. 4, 1959 |

FOREIGN PATENTS

| | | |
|---|---|---|
| 743,130 | Great Britain | July 18, 1956 |
| 754,183 | Great Britain | Aug. 1, 1956 |
| 754,559 | Great Britain | Aug. 8, 1956 |

OTHER REFERENCES

International Conference on the Peaceful Uses of Atomic Energy, U.N. Publication P. 955, vol. 3, pp, 232–236, 330–335, vol. 2, p. 436.

Amorosi et al.: Vol. 3, page 136, International Conference on the Peaceful Uses of Atomic Energy, U.N. Publ.

Technical Information Service Extension, Oak Ridge, Tenn.

AECU–3170, 1955 Technical Information Service, Oak Ridge, Tenn.

TID–5275, "Research Reactors," October 1955, pp. 170–171.

ER–7544 Martin Power Reactor Design Report, May 1956 (Martin, Baltimore).

Westinghouse Engineer, September 1956, pp. 138–142.

TID–7529, Part II, Collected Papers and Reports of a Conference held in New York, Nov. 1 and 2, 1956, pp. 248–261.

Wilson: "Nucleonics," vol. 15, No. 8, August 1957, pp. 68–71.